(12) United States Patent
James et al.

(10) Patent No.: US 6,491,208 B2
(45) Date of Patent: Dec. 10, 2002

(54) COLD SPRAY REPAIR PROCESS

(75) Inventors: Allister William James, Orlando, FL (US); Gregg P. Wagner, Apopka, FL (US); Brij B. Seth, Maitland, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 36 days.

(21) Appl. No.: 09/729,844

(22) Filed: Dec. 5, 2000

(65) Prior Publication Data

US 2002/0066770 A1 Jun. 6, 2002

(51) Int. Cl.⁷ .............................................. B23K 31/00
(52) U.S. Cl. ...................................................... 228/119
(58) Field of Search ................................ 228/119, 244, 228/256, 261

(56) References Cited

U.S. PATENT DOCUMENTS

| | | | |
|---|---|---|---|
| 2,149,253 A | | 3/1939 | Cooper |
| 3,754,976 A | | 8/1973 | Babecki et al. |
| 4,008,844 A | * | 2/1977 | Duvall et al. ............... 228/119 |
| 4,073,599 A | | 2/1978 | Allen et al. |
| 4,285,459 A | * | 8/1981 | Baladjanian et al. ....... 228/119 |
| 4,430,360 A | | 2/1984 | Bill et al. |
| 4,552,784 A | | 11/1985 | Chu et al. |
| 4,610,698 A | | 9/1986 | Eaton et al. |
| 4,705,203 A | * | 11/1987 | McComas et al. .......... 228/119 |
| 4,714,622 A | | 12/1987 | Omori et al. |
| 4,764,089 A | | 8/1988 | Strangman |
| 4,854,196 A | | 8/1989 | Mehan |
| 4,867,639 A | | 9/1989 | Strangman |
| 4,878,953 A | * | 11/1989 | Saltzman et al. ........... 148/512 |
| 4,914,794 A | | 4/1990 | Strangman |
| 5,024,884 A | | 6/1991 | Otfinsoki |
| 5,040,718 A | * | 8/1991 | Lee et al. .................... 228/119 |
| 5,048,183 A | | 9/1991 | Cang et al. |
| 5,086,968 A | * | 2/1992 | Fawley et al. ............... 228/119 |
| 5,156,321 A | * | 10/1992 | Liburdi et al. ............... 228/119 |
| 5,210,944 A | | 5/1993 | Monson et al. |
| 5,302,414 A | | 4/1994 | Alkhimov et al. |
| 5,444,911 A | * | 8/1995 | Goodwater et al. ........ 29/889.1 |
| 5,472,745 A | * | 12/1995 | Schroeder et al. .......... 427/447 |

(List continued on next page.)

FOREIGN PATENT DOCUMENTS

JP  09-188572  *  7/1997  ........... C04B/35/66

OTHER PUBLICATIONS

M.F. Smith, et al. Cold Spray Direct Fabrication—High Rate, Solid State, Material Consolidation, Proc. of Fall 1998 Meeting of the Materials Research Soc., Boston, MA. Nov. 30–Dec. 4. 1998.

D.L. Gilmore, et al. Particle Velocity and Deposition Effiency in the Cold Spray Process JTTEE5 8:576–582 (Submitted Dec. 1, 1998; in revised form May 21, 1999).

H, Kreye, T. Stoltenhoff, Cold Spraying—A Study of Process and Coating Characteristics Universitat der Bundeswehr, Hamburg, Germany.

(List continued on next page.)

*Primary Examiner*—M. Alexandra Elve
*Assistant Examiner*—Zidia Pittman

(57) ABSTRACT

A process (30) for the repair of a component part (36,66) incorporating a cold spray process step (50) for depositing material particles (54) to fill a discontinuity (40) in the part surface (42) or to create a desired surface geometry (78) on the part (66). The cold spray process may be controlled to provide a grit blasting effect prior to depositing the material in order to remove contaminants (48) from the surface of the part. The material deposited (56) by the cold spray process may form a joint (78) between an insert (72) and the part (66). The process may be used to repair parts made of directionally solidified (DS) or single crystal (SC) base material (44) without causing a re-crystallization of the base material. The process may further be used to deposit repair material (56) over a braze material (22).

17 Claims, 3 Drawing Sheets

U.S. PATENT DOCUMENTS

| | | |
|---|---|---|
| 5,506,055 A | 4/1996 | Dorfman et al. |
| 5,511,721 A * | 4/1996 | Demo et al. ................. 228/119 |
| 5,516,586 A | 5/1996 | Singer et al. |
| 5,536,022 A | 7/1996 | Sileo et al. |
| 5,575,145 A * | 11/1996 | O'Neill et al. ............. 29/889.1 |
| 5,596,912 A | 1/1997 | Laurence et al. |
| 5,302,414 A | 2/1997 | Alkhimov et al. |
| 5,704,759 A | 1/1998 | Draskovich et al. |
| 5,730,806 A | 3/1998 | Caimi et al. |
| 5,780,116 A | 7/1998 | Sileo et al. |
| 5,780,171 A | 7/1998 | Nissley et al. |
| 5,782,414 A | 7/1998 | Nathenson |
| 5,795,626 A | 8/1998 | Gabel et al. |
| 5,817,267 A | 10/1998 | Covino et al. |
| 5,845,846 A | 12/1998 | Watanabe et al. |
| 5,975,410 A * | 11/1999 | Slattery et al. ............. 228/175 |
| 5,997,248 A | 12/1999 | Ghasripoor et al. |
| 6,015,586 A | 1/2000 | Omori et al. |
| 6,038,900 A | 3/2000 | Miyasaka |
| 6,102,656 A | 8/2000 | Nissley et al. |
| 6,103,186 A | 8/2000 | Sievers et al. |
| 6,258,402 B1 * | 7/2001 | Hussary et al. ............ 219/76.1 |
| 6,297,466 B1 * | 10/2001 | Hussary et al. ........ 219/121.47 |
| 6,300,588 B1 * | 10/2001 | Hughes et al. ........... 219/69.11 |
| 6,365,222 B1 * | 4/2002 | Wagner et al. .............. 148/537 |

OTHER PUBLICATIONS

R.C. Dykhuizen and M.F. Smith, Gas Dynamic Principles of Cold Spray (Submitted Sep. 10, 1997; in revised form Mar. 9, 1998).

R.C. Dykhuizen, et al. Impact of High Velocity Cold Spray Particles (Submitted Nov. 20, 1998; in revised form May 12, 1999).

Dr. Mark F. Smith, Overview of Cold Spray, Cold Spray Workshop Albuquerque, NM Jul. 14–15, 1999.

Mark F. Smith, et al. Thermal Spray at Sandia, Process & Materials Development to Support the D.O.E. and U.S. Industrial Competitiveness.

Sandia's Approach to Cold Spray Research Thermal Spray Research Laboratory.

* cited by examiner

COLD SPRAY REPAIR PROCESS

This invention relates generally to the field of materials technologies, and more specifically to the field of component part fabrication and repair, and specifically to a process for fabricating or repairing a turbine component by applying layers of a material using a cold spray technique.

BACKGROUND OF THE INVENTION

It is well known that the power and efficiency of operation of a gas turbine engine or a combined cycle power plant incorporating such a gas turbine engine may be increased by increasing the firing temperature in the combustion portions of the turbine. The demand for improved performance has resulted in advanced turbine designs wherein the peak combustion temperature may reach 1,400 degrees C. or more. Special materials are needed for components exposed to such temperatures. Nickel and cobalt based superalloy materials are now used for components in the hot gas flow path, such as combustor transition pieces and turbine rotating and stationary blades. Such superalloy materials are known in the art and include, for example, alloys 738, Mar M247 and CM 247LC. It is also known to coat a superalloy metal component with an insulating material to improve its ability to survive high operating temperatures in a combustion turbine environment. A ceramic top coat may be applied to a superalloy substrate structure with an intermediate metallic bond coat. Common ceramic insulating materials include yttria stabilized zirconia (YSZ), hafnia or scandia stabilized zirconia, and yttrium aluminum garnet (YAG). The bond coat layer provides oxidation resistance and improved adhesion for the thermal barrier coating layer. Common bond coat materials include MCrAlY and MCrAlRe, where M may be nickel, cobalt, iron or a mixture thereof. The metallic bond coat provides a level of thermal insulation, and in some applications may be used alone without an overlying ceramic layer.

Superalloy materials may be cast conventionally or as directionally solidified (DS) or single crystal (SC) material. Once the material is in the directionally solidified or single crystal structure, it is undesirable to subject the material to a combination of temperature and mechanical work that would result in its re-crystallization. A weld repair to a part formed of a directionally solidified or single crystal material may significantly degrade the material properties and operating performance of the part as a result of re-crystallization in the heat affected zone of the weld, as well as possible re-crystallization in other areas of the part occurring during any associated post-weld heat treatment.

FIG. 1 illustrates a top view of a prior art turbine blade 10 including a blade root 12, an airfoil portion 14 and a tip portion 16. The blade root 12 is designed to be inserted into and retained by a disc on a rotating shaft (not shown) of the turbine. The airfoil portion 14 is shaped to extract energy from combustion gases passing over the airfoil portion 14, thereby imparting rotating mechanical energy to the turbine shaft. A thermal barrier coating, such as described above, may be applied to a portion of the airfoil portion 14. Airfoil portion 14 may be designed to include one or more cooling passages formed below the surface of the airfoil for the passage of cooling air necessary to ensure the integrity of the blade material in the hot combustion gas environment. During the manufacturing process, such cooling passages are drilled or cast to extend from the edge of the blade tip portion 16. These openings must then be sealed during the fabrication process in order to assure the proper flow of the cooling air within the blade 10. If the size of the opening is sufficiently small, it may be sealed by a weld plug 18. For larger openings, it may be necessary to cover the opening with a cap, such one or more plates 20, in order to seal the opening. U.S. Pat. No. 4,073,599 issued on Feb. 14, 1978, to Allen et al. describes such a blade tip closure design. Plates 20 are mechanically restrained by the structure of the blade tip 16 and are held in position and sealed by one or more brazed joints 22.

It is known that turbine blades 10 may develop one or more cracks 24 near the tip 16 of the blade 10 due to low cycle fatigue stresses imparted on the tip 16 during the operation of the turbine. The turbine blade 10 must be removed from service and/or repaired before a crack 24 extends beyond a critical dimension in order to prevent catastrophic failure of the blade and turbine. It can be appreciated that a crack 24 may be repaired by removing the material adjacent to the crack 24 to form a crack repair volume, and then filling the crack repair volume with weld metal. However, the presence of braze joint 22 can complicate the repair process, since weld integrity is adversely affected when applied over a braze material.

The repair of turbine component parts is complicated by the difficulties associated with welding, in general, and the welding of superalloy materials, in particular. Welding operations are further complicated by the presence of contaminants on the surface of the part to be repaired, and the proximity of braze material in the vicinity of the weld. Post-weld heat treatment adds time and cost to the repair, and it may further degrade the properties of directionally solidified or single crystal base materials. Thus, an improved process is needed for repairing turbine component parts.

BRIEF DESCRIPTION OF THE INVENTION

The present invention utilizes a cold spray material deposition process in lieu of welding to fabricate or repair a component part. By depositing repair material with a cold spray process, the re-crystallization of directionally solidified and single crystal base materials is prevented, and the need for a high temperature heat treatment is eliminated. Repairs employing the cold spray deposition of repair material may be made directly over brazed material. Insert materials may be joined to a part by forming a joint from cold sprayed material. The immediate area of a repair may be cleaned of contaminants during a cold spray material deposition step by the grit blasting effect of a cold spray pattern halo.

Accordingly, a process for repairing a component part is described herein as including the steps of: identifying a discontinuity in a part surface; excavating material from the part surface proximate the discontinuity to form a repair surface; and directing particles of a repair material toward the part at a velocity sufficiently high to cause the particles to deform and to adhere to the repair surface.

A process for repairing a turbine is described herein as including the steps of: at least partially disassembling a turbine to provide access to a part having an area to be repaired without removing the part from the turbine; directing particles of a repair material toward the area to be repaired at a velocity sufficiently high to cause the particles to deform and to adhere to the surface of the area to be repaired; and re-assembling the turbine.

A process for repairing a turbine blade having a crack in a tip portion is described, the tip portion including a plate joined to the tip portion by a braze joint, the crack being proximate the braze joint, the process comprising the steps of: preparing the surface of the tip portion proximate the crack to form a repair surface, the repair surface extending to include at least a portion of the braze joint; and directing particles of a repair material toward the repair surface at a velocity sufficiently high to cause the particles to deform and to adhere to the repair surface.

A metals joining process is described as including the steps of: forming a first joining surface on a first part comprising a first metal; forming a second joining surface on a second part comprising a second metal; positioning the first joining surface proximate the second joining surface; and directing particles of a joining material toward the first and the second joining surfaces at a velocity sufficiently high to cause the particles to deform and to adhere to the first and the second joining surfaces to form a joint there between.

A process for repairing a part is described herein as including the steps of: identifying a discontinuity in a surface of a part; directing a pattern of particles of a repair material toward the surface of the part, the pattern having a center area and a halo area surrounding the center area; wherein the speed of the particles in a direction perpendicular to the surface of the part is sufficiently high in the center area to cause the particles to deform and to adhere to the surface of the part; and wherein the speed of the particles in a direction perpendicular to the surface of the part is not sufficiently high in the halo area to cause the particles to deform and to adhere to the surface of the part but is sufficiently high to remove contaminants from the surface of the part; moving the pattern of particles across the discontinuity so that particles in the halo area first clean the surface of the part proximate the discontinuity and particles in the center area then adhere to the surface of the part to repair the discontinuity.

A process for forming a desired geometry on a part, the process comprising the steps of: forming a part having a geometry other than a desired geometry; directing particles of a material toward the part at a velocity sufficiently high to cause the particles to deform and to adhere to the surface of the part; and continuing the step of directing particles until the desired geometry is formed.

In a further embodiment, a process for repairing a component part is described, the process including the steps of: identifying a discontinuity producing an unacceptable stress rise in a part; directing particles of a repair material toward the discontinuity at a velocity sufficiently high to cause the particles to deform and to adhere to the surface of the discontinuity; and continuing the step of directing particles until the discontinuity has been filled with repair material to an extent necessary to reduce the stress rise to a desired level.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

U.S. Pat. No. 5,302,414 dated Apr. 12, 1994, incorporated by reference herein, and related re-examination certificate B1 5,302,414 dated Feb. 25, 1997, describe a cold gas dynamic spraying method for applying a coating, also referred to as cold spraying. That patent describes a process and apparatus for accelerating solid particles having a size from about 1–50 microns to supersonic speeds in the range of 300–1,200 meters per second and directing the particles against a target surface. When the particles strike the target surface, the kinetic energy of the particles is transformed into plastic deformation of the particles, and a bond is formed between the particles and the target surface. This process forms a dense coating with little or no thermal effect on the underlying target surface.

The present invention provides an improved repair or fabrication process by utilizing a cold spraying material deposition process in lieu of welding or brazing. The use of a cold spraying process is especially advantageous for components formed of a superalloy material. As will be described more fully below, repair processes in accordance with the present invention may be accomplished in a field environment, and in some cases, with the part remaining in-situ. Furthermore, repair process in accordance with the present invention allow superalloy materials to be deposited over brazed metal without an increased risk of cracking, as is the case with prior art welding processes.

Figure 2:
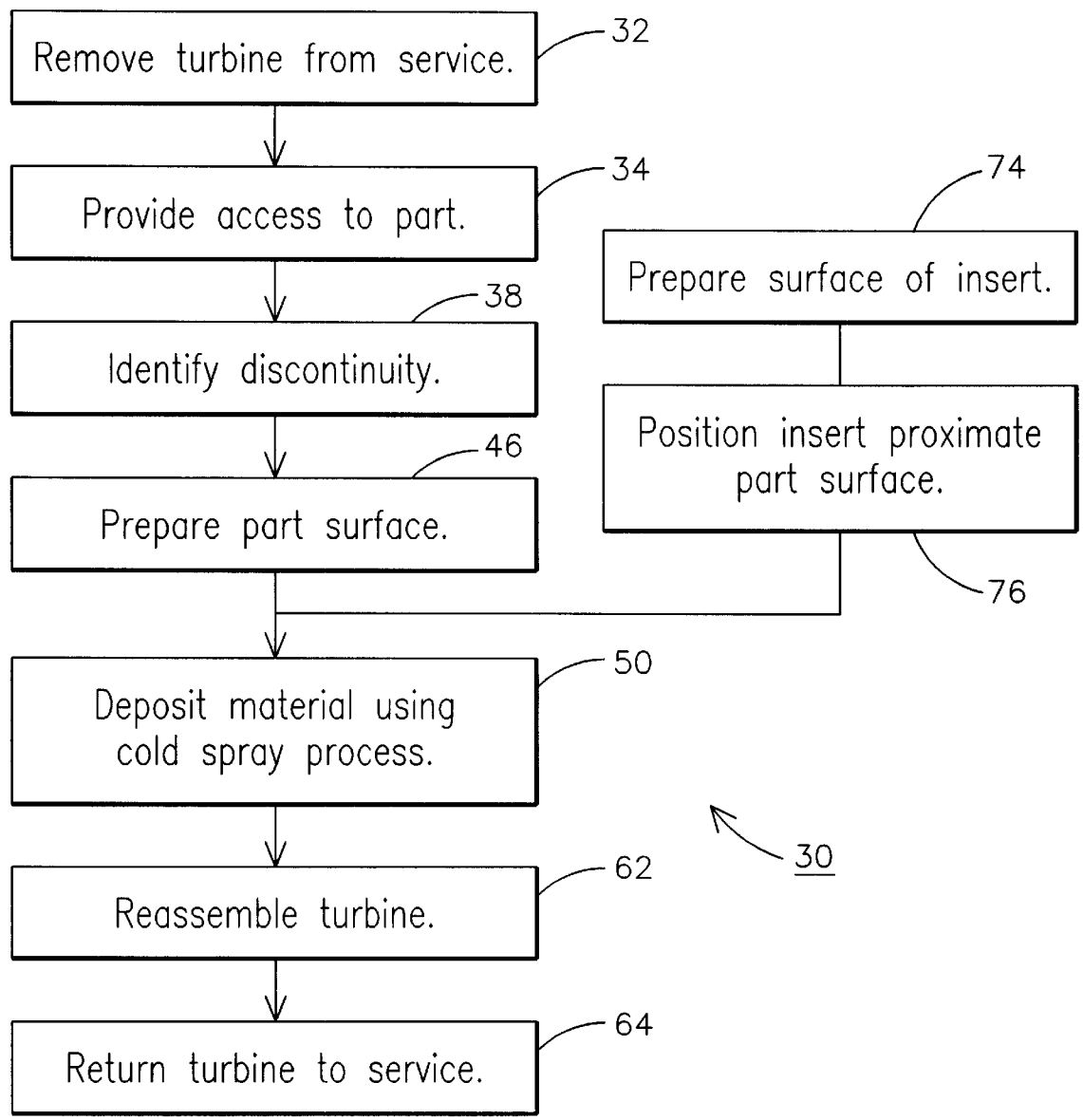
FIG. 2 is a flow chart of a process for repairing a turbine engine incorporating a cold spray material deposition process.

FIG. 2 illustrates the steps of a repair process 30 incorporating a cold spray material deposition step in lieu of welding. For the purpose of illustration, the repair process 30 is described in relation to the repair of a turbine engine part, although one may appreciate that the process may be beneficially employed on any type of component part.

Figure 1:
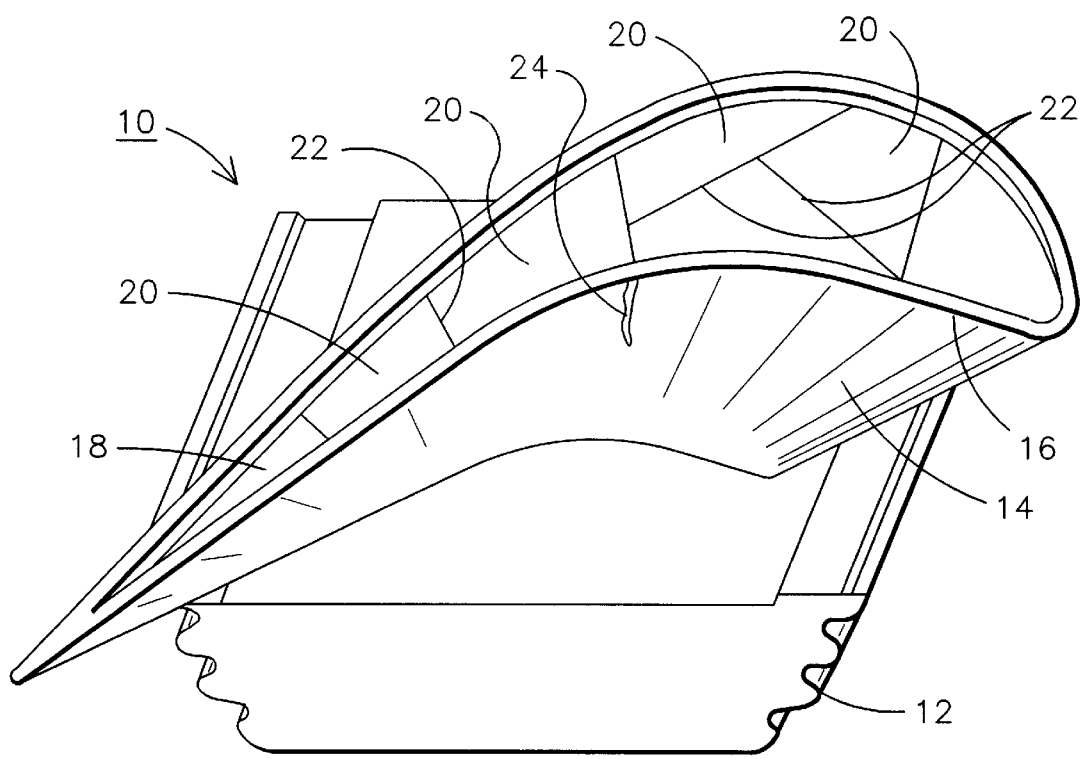
FIG. 1 is a top perspective view of a prior art turbine blade having a cracked tip portion.

A turbine engine is removed from service at step 32 for either a scheduled or unplanned outage. At least partial disassembly of the turbine is accomplished at step 34 to provide access to a part 36, illustrated in partial cross-section in FIG. 3. The turbine is subjected to any variety of known non-destructive examinations, for example visual, magnetic particle, dye penetrant, ultrasonic, or eddy current tests. Such tests may identify a discontinuity in the part at step 38 of FIG. 2. One such type of discontinuity may be a crack 40 extending from a surface 42 of the part 36 into the base material 44. The crack 24 illustrated in the turbine blade tip 16 of FIG. 1 is one example of the location of such a crack 40 in a combustion turbine engine. Other types of discontinuities may include a pit resulting from oxidation or chemical attack and a notch resulting from a mechanical impact. Such discontinuities are known to be detrimental to the performance of a part due to the rise in the level of stress generated around the discontinuity. Should the stress rise increase to an unacceptable level, the part 36 may be subject to a premature, and sometimes precipitous, failure resulting from the propagation of the discontinuity.

The part surface 42 is then prepared for the repair of crack 40 at step 46. Surface preparation may involve the cleaning away of contaminants 48 from the part surface 42. Such contaminants may include products of the oxidation of the base material 44 or deposits of foreign substances, such as the byproducts of combustion from the burning of fuel in a combustion turbine engine. Contaminants may be cleaned by any known chemical, mechanical or acoustical technique.

The part surface 42 may be prepared for the repair of crack 40 by removing a portion of the base material 44 proximate the discontinuity. For example, it may be desired to excavate material from the part surface 42 to form a repair surface 49 as indicated in phantom in FIG. 3. Repair surface 49 may be selected to be free from sharp edges to minimize locations of stress concentration. Excavation of base material 44 may be accomplished by any known technique, such as grinding.

Figure 3:
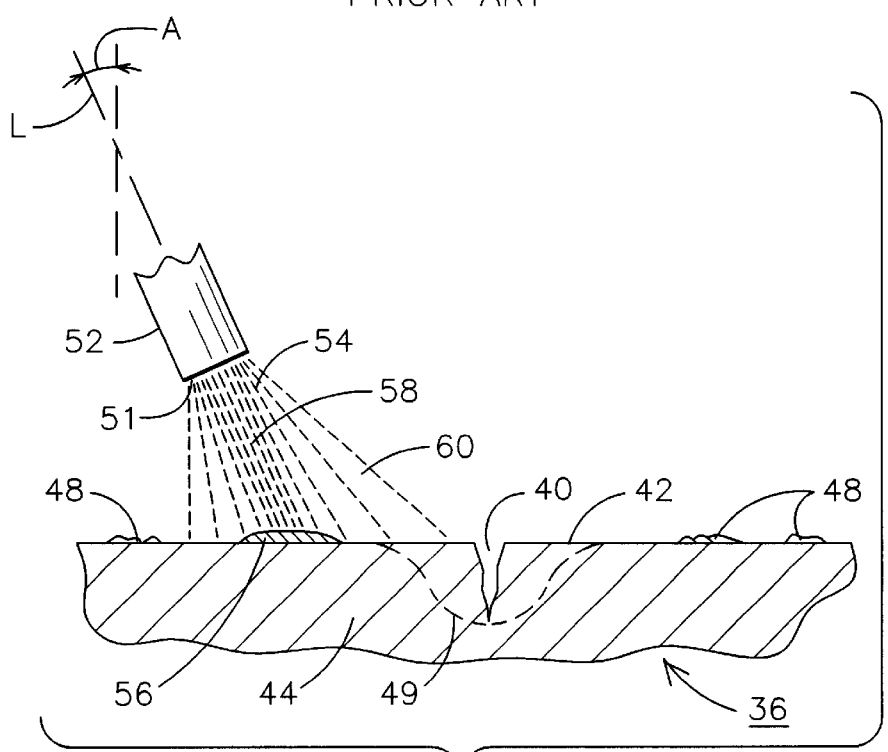
FIG. 3 is a partial cross-sectional view of a part containing a discontinuity being subjected to a cold spray repair process.
Figure 4:
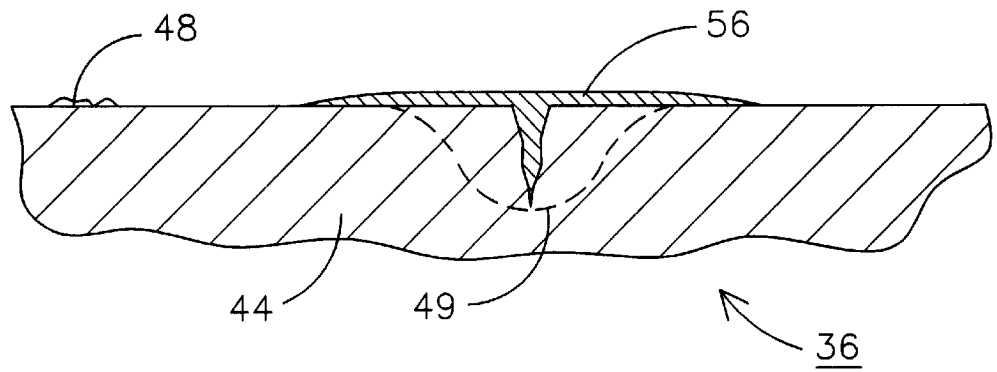
FIG. 4 is a partial cross-sectional view of the part of FIG. 3 after completion of a repair process incorporating a cold spray material deposition step.

A cold spray material deposition step 50 is then applied to the part surface 42 and/or repair surface 49. As taught in U.S. Pat. No. 5,302,414, incorporated by reference herein, cold spray material deposition involves directing small solid particles of a material toward a surface at a velocity sufficiently high to cause the particles to deform and to adhere to the surface. Particle sizes may range from about 1–50 microns or more, and the speed of approach to the target surface may range from about 300–1,200 meters per second or more. The actual particle velocity may need to be even higher to achieve such an approach speed when the outlet nozzle 51 of a cold spray apparatus 52 is oriented at an angle A from perpendicular to the target surface, as illustrated in FIG. 3. The outlet nozzle 51 of cold spray apparatus 52 is moved across the part surface 42 in one or more passes and a spray pattern of solid particles of repair material 54 is directed toward the part surface 42. The particles deform and adhere to the part surface 42 to form a layer of repair material 56. As the cold spray apparatus 52 is moved past discontinuity 40, the layer of repair material 56 fills the discontinuity 40, as illustrated in FIG. 4. FIG. 4 is shown to have the layer of repair material 56 extending into the volume of crack 40. One may appreciate that if a repair surface 49 had been formed by excavating additional base material 44, the layer of repair material 56 would extend from the repair surface 49. One or multiple passes of the cold spray apparatus 52 may be made over the discontinuity 40 to fill the discontinuity and to establish a desired surface geometry on the layer of repair material 56. Because the spray pattern of solid particles of repair material 54 may be focused to a relatively small area, the build-up of the layer of repair material 56 may be controlled to achieve a desired surface geometry and contour. Because the adhesion of the layer of repair material 54 results from a mechanical process rather than a chemical process, it is possible to deposit a layer of superalloy material 56 over a base material 44 that includes brazed metal without adverse consequences.

The spray pattern of solid particles of repair material 54 may be designed to have a predetermined cross-section by the corresponding design of the outlet nozzle 51 and cold spray apparatus 52. Due to the natural dispersion of a particle stream resulting from particle interaction, the spray pattern will have a center area 58 containing a relatively larger concentration of particles travelling in a direction most closely parallel to the longitudinal spray axis L of the outlet nozzle. The spray pattern will also have a halo area 60 surrounding the center area 58 where there will be a relatively smaller concentration of particles travelling in a direction more angled away from the axis L of the outlet nozzle 51. In one embodiment of the present invention, this combination of center area 58 and halo area 60 is used advantageously to remove contaminants 48 from the surface 42 of the part 36 during the step 50 of depositing a layer of repair material 56. Variables such as the particle velocity exiting the outlet nozzle 51, the angle A of incidence of the spray axis L relative to the target surface, the type and size of particles 54, and the design of the outlet nozzle 51 may be controlled. Accordingly, the speed of the particles 54 in a direction perpendicular to the surface 42 may be sufficiently high in the center area 58 to cause the particles 54 to deform and to adhere to the surface 42. However, the speed of the particles 54 in a direction perpendicular to the surface 42 may not be sufficiently high to cause the particles to adhere in the halo area 60, but rather may be sufficiently high to remove contaminants 48 by mechanical abrasion. As illustrated by comparing FIGS. 3 and 4, surface contaminants 48 have been removed by the action of the halo area particles in all portions of the surface 42 having been subjected to the cold spray material deposition step 50.

Upon the completion of the material deposition step 50, the turbine may be re-assembled and placed back into service, at steps 62,64 respectively. Because the outlet nozzle 51 of a cold spray apparatus 52 may be made small enough to be hand-held and directed, the process of the present invention makes possible the field repair of discontinuities. In one embodiment, cold spray apparatus 52 is delivered to the site of a turbine engine, the engine is partially disassembled at step 34 and the part is moved to the on-site location of the cold spray apparatus 52. In another embodiment, a machine may be partially disassembled to provide access to a part to be repaired, and the nozzle 51 may be moved proximate the part target surface in-situ without removing the part from the machine. Such applications may be most practical with large apparatus and in machines where a small amount of particle debris will not be harmful during the later operation of the machine.

Figure 5:
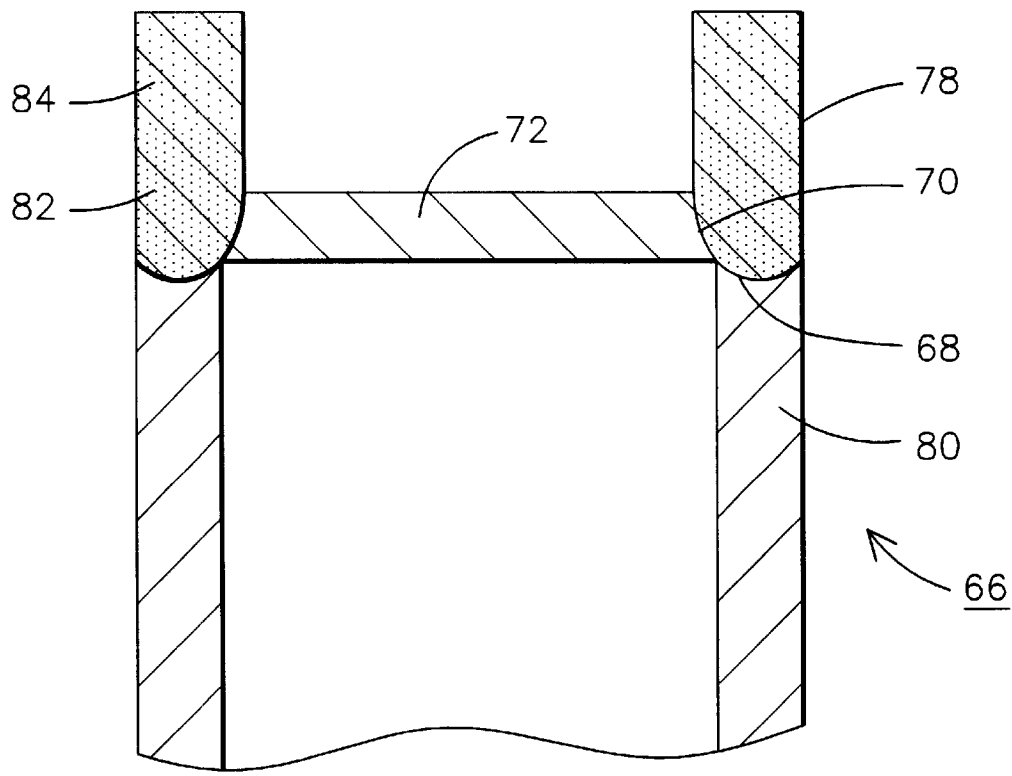
FIG. 5 is a partial cross-sectional view of a turbine engine blade tip after being repaired by a process of attaching an insert with a cold spray material deposition process.

FIG. 5 illustrates a combustion turbine blade tip 66 after the completion of a repair in accordance with another embodiment of the present invention. A turbine blade is prepared by removing a portion of the as-cast tip. This may be done with a new blade where the ceramic insert used to define the ventilation openings has moved too close to the surface of the blade, or it may be done with an in-service blade where a discontinuity has formed, such as is illustrated in FIG. 1. One or more joining surfaces 68 are formed on the blade tip ends as part of step 46 of FIG. 2. In the embodiment illustrated in FIG. 5, this first joining surface has a slightly concave shape to improve the load carrying capability of the final product. A second joining surface 70 is then formed on an insert such as cap 72 at step 74. The two joining surfaces 68,70 are then positioned proximate each other at step 76, and a cold spray material deposition process is performed to form a joint 78 there between at step 50. The joint 78 in this embodiment is shaped to form a "squealer" on the blade tip 66. A squealer is a structure extending from a blade tip for the purpose of sealing against the flow of combustion gas around the blade tip 66. In this embodiment, a first portion 82 of the joint 78 may be formed of a first repair material selected for its strength and mechanical joining properties, for example, the same material as the blade itself. As the step 50 of depositing material continues, particles of a different material or mix of materials may be used to form a second topmost portion 84 of the squealer. The second material may be selected for its abrasion and lubrication properties, since it is this portion that will likely make contact with the surrounding blade ring (not shown) during operation of the turbine. Such materials may include a matrix of superalloy material and cubic boron nitride.

One may appreciate that the process described above replaces a weld or braze repair process by using the low temperature joining features of a cold spray process in lieu of the high temperature, metallurgical joining features of a welding or brazing process. Accordingly, the properties of base metal 80 of blade tip 66 are unaffected by the repair process. Advantageously, a directionally solidified or single crystal superalloy base metal 80 will not undergo re-crystallization as a result of the repair process 30. A part may be formed to have a desired geometry, such as the squealer of FIG. 5, by using the process described herein. The part may be first formed with a geometry other than the desired geometry by any known process. Additional material may then be added to the part with a cold spray material deposition step to achieve a desired geometry. In certain embodiments, some additional material fabrication steps, such as a machining operation, may be necessary to place the part in a final geometry after the cold spray material deposition step. As illustrated in FIG. 5, the desired geometry may incorporate a separate insert that is joined to the original part by a joint formed by a cold spray material deposition step 50.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A process for repairing a component part, the process comprising the steps of:
    identifying a discontinuity in a part surface;
    excavating material from the part surface proximate the discontinuity to form a repair surface comprising a brazed material; and
    directing particles of a repair material toward the part at a velocity sufficiently high to cause the particles to deform and to form a mechanical bond but not a chemical bond to the brazed material.

2. A process for repairing a turbine, the process comprising the steps of:
    at least partially disassembling a turbine to provide access to a part having an area to be repaired without removing the part from the turbine;
    directing particles of a repair material toward the area to be repaired at a velocity sufficiently high to cause the particles to deform and to adhere to the surface of the area to be repaired; and
    re-assembling the turbine.

3. The process of claim 2, wherein a first portion of the particles directed toward the area to be repaired comprise a center area wherein the velocity is sufficiently high to cause the particles to deform and to adhere to the surface, and wherein a second portion of the particles directed toward the area to be repaired comprise a halo area surrounding the center area, and further comprising the step of preparing the area to be repaired by directing the second portion of the particles of the repair material toward the discontinuity at a velocity lower than that necessary to cause the particles to deform and to adhere to the surface of the discontinuity but sufficiently high to remove surface contamination.

4. A process for repairing a turbine blade having a crack in a tip portion, the tip portion including a plate joined to the tip portion by a brazed joint, the crack being proximate the brazed joint, the process comprising the steps of:
    preparing the surface of the tip portion proximate the crack to form a repair surface, the repair surface extending to include at least a portion of the brazed joint; and
    directing particles of a repair material toward the repair surface at a velocity sufficiently high to cause the particles to deform and to adhere mechanically to the repair surface without metallurgical joining with the braze joint.

5. The process of claim 4, wherein the step of directing particles further comprises directing particles of a superalloy material to mechanically bond over the braze joint without metallurgical joining with the braze joint.

6. A metals joining process comprising the steps of:
    forming a first joining surface on a first part comprising a first metal;
    forming a second joining surface on a second part comprising a second metal;
    positioning the first joining surface proximate the second joining surface;
    directing particles of a joining material toward the first and the second joining surfaces at a velocity sufficiently high to cause the particles to deform and to adhere to the first and the second joining surfaces to form a joint therebetween.

7. The process of claim 6, wherein at least one of the first metal and the second metal comprise one of a directionally solidified and a single crystal metal, and wherein the joint is formed without recrystallization of the one of a directionally solidified and a single crystal metal.

8. A process for repairing a part comprising the steps of:
    identifying a discontinuity in a surface of a part;
    directing a pattern of particles of a repair material toward the surface of the part, the pattern having a center area and a halo area surrounding the center area;
    wherein the speed of the particles in a direction perpendicular to the surface of the part is sufficiently high in the center area to cause the particles to deform and to adhere to the surface of the part; and
    wherein the speed of the particles in a direction perpendicular to the surface of the part is not sufficiently high in the halo area to cause the particles to deform and to adhere to the surface of the part but is sufficiently high to remove contaminants from the surface of the part; and
    moving the pattern of particles across the discontinuity so that particles in the halo area first clean the surface of the part proximate the discontinuity and particles in the center area then adhere to the surface of the part to repair the discontinuity.

9. A process for forming a desired geometry on a part, the process comprising the steps of:
    forming a part having a geometry other than a desired geometry;
    directing particles of a material toward the part at a velocity sufficiently high to cause the particles to deform and to adhere to the surface of the part; and
    continuing the step of directing particles until the desired geometry is formed;
    wherein the part comprises one of a single crystal and a directionally solidified material, and wherein the particles adhere to the surface of the part without recrystallization of the one of a single crystal and a directionally solidified material.

10. The process of step 9, further comprising the steps of:
    providing an insert;
    positioning the insert proximate the part; and wherein
    the step of directing particles comprises directing the particles to form a joint between the insert and the part.

11. A process for repairing a component part, the process comprising the steps of:

identifying a discontinuity producing an unacceptable stress rise in a part;

directing particles of a repair material toward the discontinuity at a velocity sufficiently high to cause the particles to deform and to adhere to the surface of the discontinuity; and continuing the step of directing particles until the discontinuity has been filled with repair material to an extent necessary to reduce the stress rise to a desired level;

wherein the discontinuity is proximate a braze material portion of the part, and wherein the step of directing particles further comprises directing particles of a superalloy material toward the discontinuity at a velocity sufficiently high to cause the particles to deform and to adhere mechanically to the surface of the braze material without forming a metallurgical bond to the braze material.

12. The process of claim 11, further comprising the step of preparing the surface of the part proximate the discontinuity prior to the step of directing particles by directing particles of the repair material toward the discontinuity at a velocity lower than that necessary to cause the particles to deform and to adhere to the surface of the discontinuity but sufficiently high to remove surface contamination.

13. A process for repairing a component part, the process comprising the steps of:

identifying a discontinuity producing an unacceptable stress rise in a part;

directing particles of a repair material toward the discontinuity at a velocity sufficiently high to cause the particles to deform and to adhere to the surface of the discontinuity; and continuing the step of directing particles until the discontinuity has been filled with repair material to an extent necessary to reduce the stress rise to a desired level, wherein the part comprises one of a single crystal and a directionally solidified material, and wherein the step of directing particles further comprises directing particles of a repair material toward the discontinuity at a velocity sufficiently high to cause the particles to deform and to adhere to the surface of the part without re-crystallization of the single crystal or directionally solidified material.

14. A method of repairing a part, the method comprising:

providing a cold spray apparatus having an outlet nozzle for directing a spray of particles along a spray axis in a pattern having a center area and a halo area surrounding the center area;

positioning the outlet nozzle proximate a surface of the part to be repaired so that the spray axis is at a non-perpendicular angle to a surface of the part;

operating the cold spray apparatus so that particles in the center area strike the surface at a velocity relative to the surface that is sufficiently high to cause the particles to deform and to adhere to the surface of the part and so that particles in the halo area strike the surface at a velocity relative to the surface that is not sufficiently high to cause the particles to deform and to adhere to the surface but that is sufficiently high to clean the surface; and moving the outlet nozzle relative to the surface of the part so that a predetermined area of the part is first exposed to particles of the halo area to clean the predetermined area and is then exposed to particles of the center area to deposit a coating of particles onto the predetermined area.

15. A method of applying a coating to a surface, the method comprising:

directing particles of a first solid material toward the surface at a velocity sufficiently high to cause the particles to deform and to adhere to the surface to form a first layer of a coating; and directing particles of a second solid material toward the surface at a velocity sufficiently high to cause the particles to deform and to adhere to the first layer to form a second layer of the coating having a different composition than the first layer of the coating.

16. The method of claim 15 as applied to a turbine blade tip, wherein the second solid material is selected for its abrasion and lubrication properties.

17. The method of claim 15 as applied to a turbine blade tip, wherein the second solid material comprises a mixture of a superalloy material and cubic boron nitride.

* * * * *